(12) United States Patent
Jurik et al.

(10) Patent No.: US 6,364,357 B1
(45) Date of Patent: Apr. 2, 2002

(54) TELESCOPING STEERING COLUMN AND BRACKET

(75) Inventors: Mirjana Jurik; Thomas Dziegielewski, both of Rochester Hills, MI (US); Scott D Laney, Toledo, OH (US); John M Stoiber, Oregon, OH (US); Kurt E Hofmeister, Holland, OH (US)

(73) Assignee: DaimlerChyrsler Corporation, Auburn Hills, MI (US)

( * ) Notice: Subject to any disclaimer, the term of this patent is extended or adjusted under 35 U.S.C. 154(b) by 0 days.

(21) Appl. No.: 09/665,753

(22) Filed: Sep. 20, 2000

(51) Int. Cl.⁷ .................................................. B62D 1/18
(52) U.S. Cl. ......................................... 280/775; 74/493
(58) Field of Search ............................. 280/775; 74/493

(56) References Cited

U.S. PATENT DOCUMENTS

| | | | |
|---|---|---|---|
| 4,541,299 A | * | 9/1985 | Kanaya et al. |
| 4,972,732 A | * | 11/1990 | Venable et al. |
| 5,199,319 A | | 4/1993 | Fujiu |
| 5,242,195 A | * | 9/1993 | Wendling |
| 5,269,562 A | | 12/1993 | Peitsmeier et al. |
| 5,332,260 A | | 7/1994 | Heinrichs et al. |
| 5,363,716 A | | 11/1994 | Budzik, Jr. et al. |
| 5,449,199 A | * | 9/1995 | Heinrichs et al. |
| 5,481,937 A | | 1/1996 | Uphaus et al. |
| 5,802,926 A | * | 9/1998 | Thomas |
| 5,813,289 A | | 9/1998 | Renick et al. |
| 5,820,163 A | | 10/1998 | Thacker et al. |
| 5,870,930 A | | 2/1999 | Willett et al. |
| 5,890,397 A | * | 4/1999 | Stoner et al. |
| 5,902,186 A | | 5/1999 | Gaukel |
| 6,035,740 A | | 3/2000 | Budaker et al. |
| 6,134,983 A | * | 10/2000 | Armstrong et al. |

* cited by examiner

Primary Examiner—Paul N. Dickson
(74) Attorney, Agent, or Firm—Mark P. Calcaterra (57) ABSTRACT

A telescoping steering column is provided with a simple means to allow ease of movement of a telescoping steering shaft through a plurality of positions. This is accomplished by placing a biasing component on an exterior of a movable portion of the steering column to bias the movement of that portion.

11 Claims, 7 Drawing Sheets

TELESCOPING STEERING COLUMN AND BRACKET

FIELD OF THE INVENTION

The present invention relates generally to steering column support structures for an automobile, and more particularly to a telescoping steering column with a spring assist mechanism to provide a smooth telescoping movement.

BACKGROUND

A steering column, including the steering shaft, provides a mechanism to translate the movement of the steering wheel to the wheels of an automobile. The movement of the steering wheel is an integral and continuous way in which an automobile driver interacts with the automobile. This being the case it is desirous to provide a means to allow the driver to adjust the position of the steering wheel so as to allow for maximum comfort and driving enjoyment. However, generally, the steering shaft is rigid and fixed allowing for no repositioning of the steering wheel once the steering column has been installed into the automobile.

It is known in the art, however, to provide a mechanism that would allow the user of the automobile the ability to change the relative orientation of the steering wheel for his optimal comfort. The mechanism provides a means to lock and unlock the position of the steering column and to move the steering column closer or further from the drivers body. Many of these mechanisms, however, do not provide a means to counter the weight and frictional forces of the steering column during movement. Generally the prior art simply provides a means to slidably engage an upper shaft with a lower shaft and a means to unlock the two shafts to allow movement of the upper shaft.

One prior art reference discloses a method to attempt to counteract the weight, friction, and other forces acting against movement of the steering column. U.S. Pat. No. 6,035,740 discloses a gas compression spring placed within the steering shaft. The gas compression spring is installed in such a fashion so as to allow for easier of movement of the steering shaft. However, this invention requires an extensive retooling of the steering shaft to allow for the introduction of such a gas compression spring. Other similar disclosures provide for a spring placed internally in the steering column to counteract the weight of the steering column during movement of the column.

SUMMARY OF THE INVENTION

It is an object of the present invention to provide a simple means to allow ease of movement of a telescoping steering shaft through a plurality of positions into and out of a steering column. The present invention is added to the exterior of the steering column and includes a wound spring in a small cassette housing that counteracts the weight of the steering column. However, the minimal size and weight of the cassette do not require the addition of extra space or weight to the steering column assembly.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
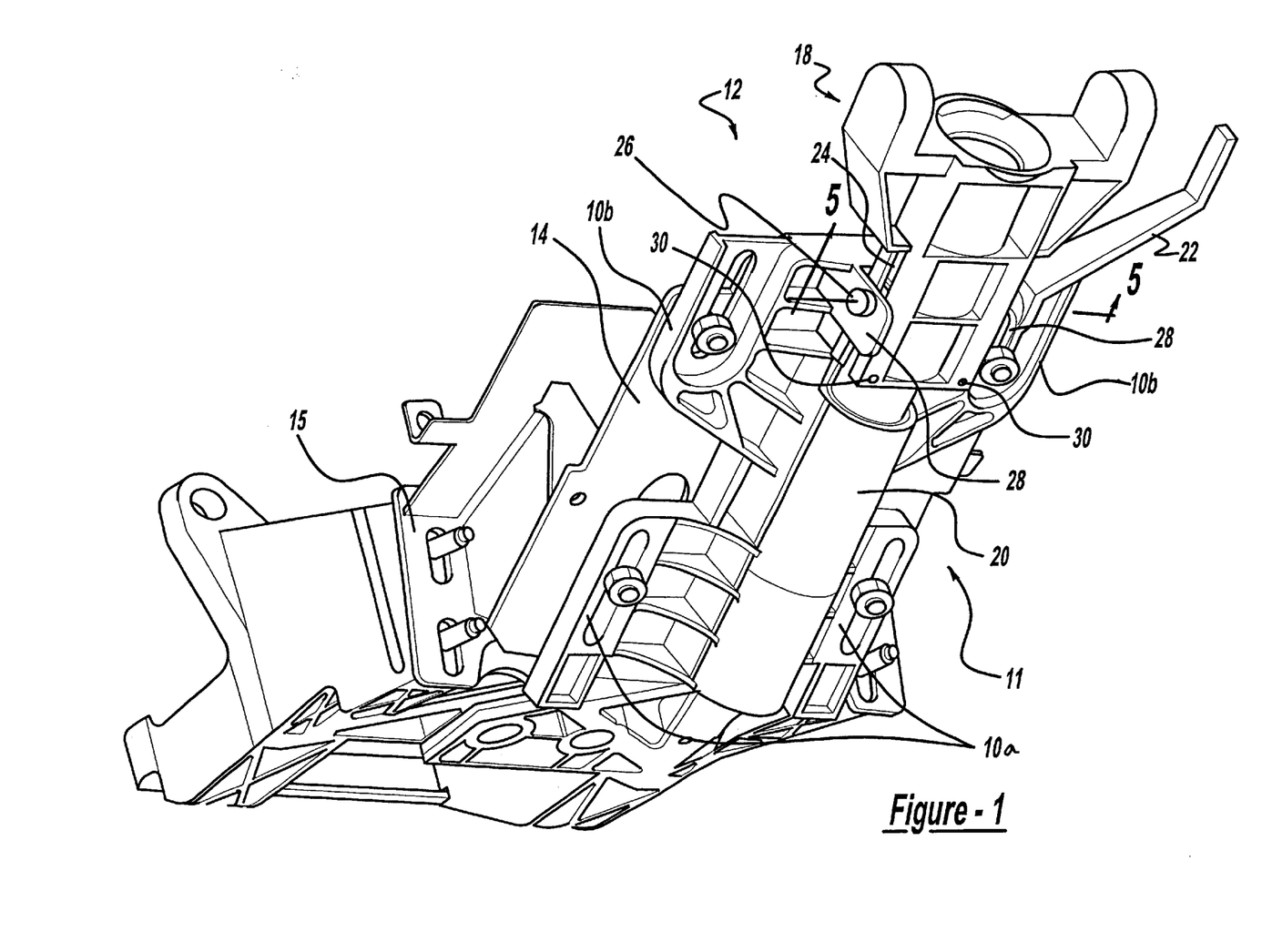
FIG. 1 is a perspective view of the upper mounting bracket of a telescoping steering column according to the principles of the present invention assembled to the instrument panel and the frame member of the automobile.

FIG. 1 illustrates a mounting bracket 12 in its assembled orientation with the support bracket 14 and the instrument panel 15.

Referring to FIG. 1 the mounting bracket 12 includes a main body 20 through which a bore 16 is formed. The bore 16 houses the steering shaft (shown in FIG. 6). Two pair of mounting flanges 10a, 10b are disposed on opposite sides of the main body 20. Such mounting flanges 10a, 10b are for attaching the mounting bracket 12 to the support bracket 14. The mounting bracket 12 has two members, a rearward bracket member 18 and a forward bracket member 11. Only the forward bracket member 11 is directly affixed to the support bracket 14. The rearward bracket member 18 is affixed to the forward bracket member 11 through mounting pins 26 which extend through the mounting pillars 28. The mounting pins 26 are further attached to the rearward bracket member 18 through the spring cassette 31 (shown in FIG. 3) placed in the channel 24 defined in rearward bracket member 18 of mounting bracket 12. The channel 24 allows rearward bracket member 18 to be moved axially relative to forward bracket member 11. A lever 22 is attached to a catch pin 42 (indicated in FIG. 5) which holds a selected position of the rearward bracket member 18. Furthermore, stop pins 30 (best shown in FIG. 1) ensure a maximum travel distance of the rearward bracket member 18.

Figure 2:
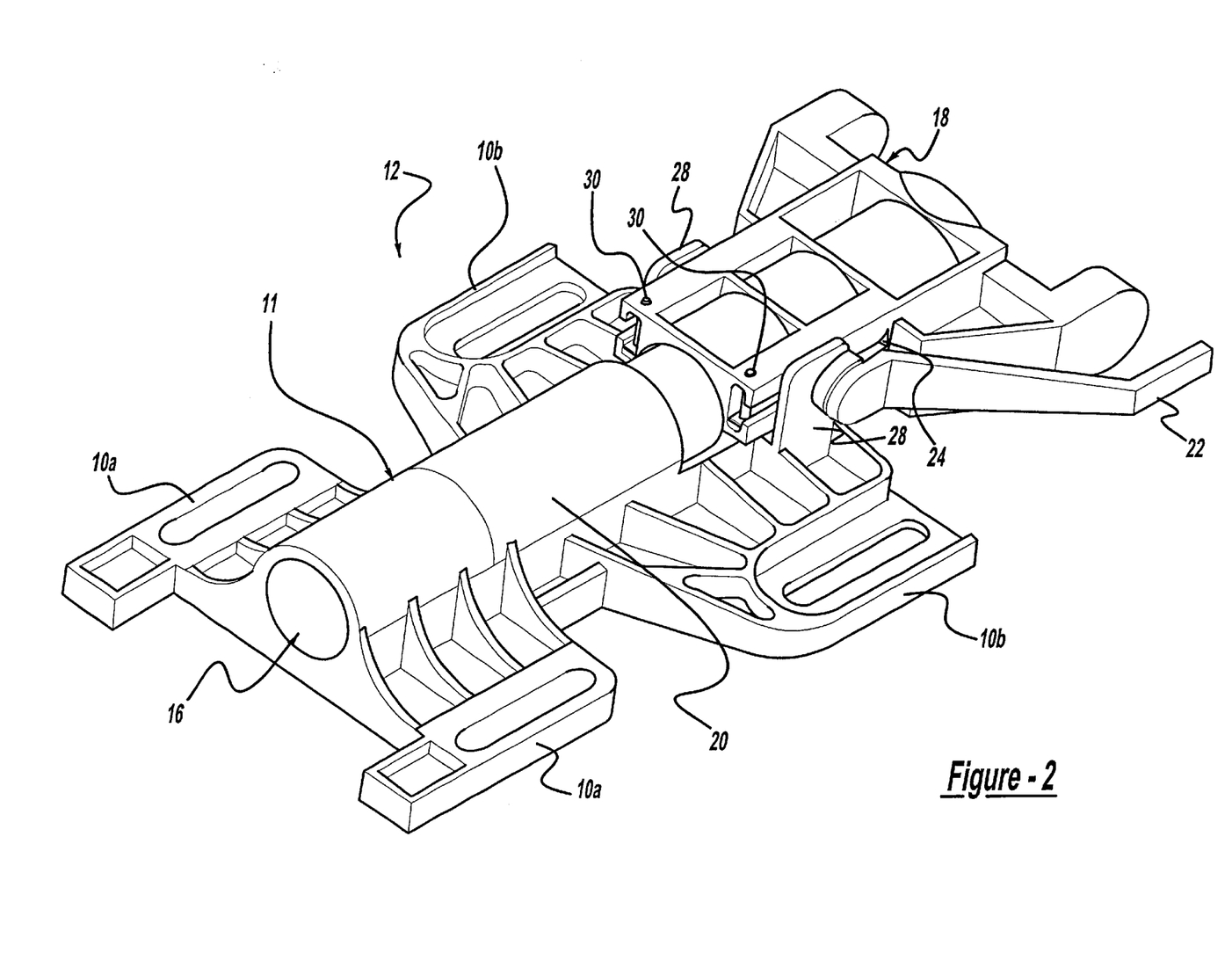
FIG. 2 is a perspective view of the upper mounting bracket of a telescoping steering column according to the principles of the present invention.

FIG. 2 is a perspective view of the mounting bracket 12 alone including the rearward bracket member 18 and the forward bracket member 11. The main body 20 of forward bracket member 11 includes a bore 16 through which a steering shaft is inserted. The rearward bracket member 18 is attached to the forward bracket member 11 through the mounting pins 26 (shown in FIG. 1) which are affixed to the mounting pillars 28. An actuating lever 22 is mounted to one of the mounting pillars 28. Further, the channel 24 guides the movement of the rearward bracket member 18 and the stop pins 30 define the maximum movement of the rearward bracket member 18.

Figure 3:
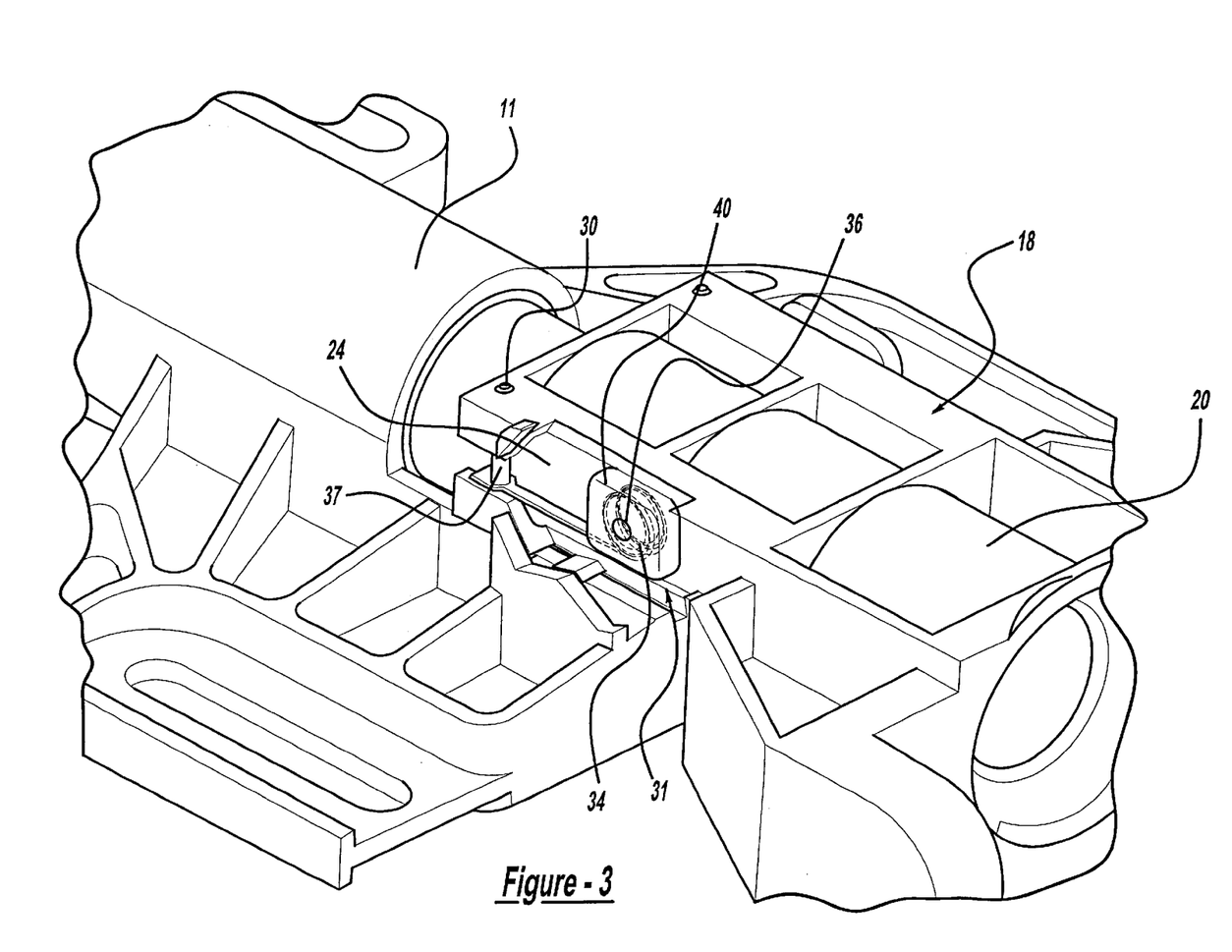
FIG. 3 is a detail view of the upper mounting bracket with a cut-away section to reveal the spring cassette apparatus according to the principles of the present invention.
Figure 4:
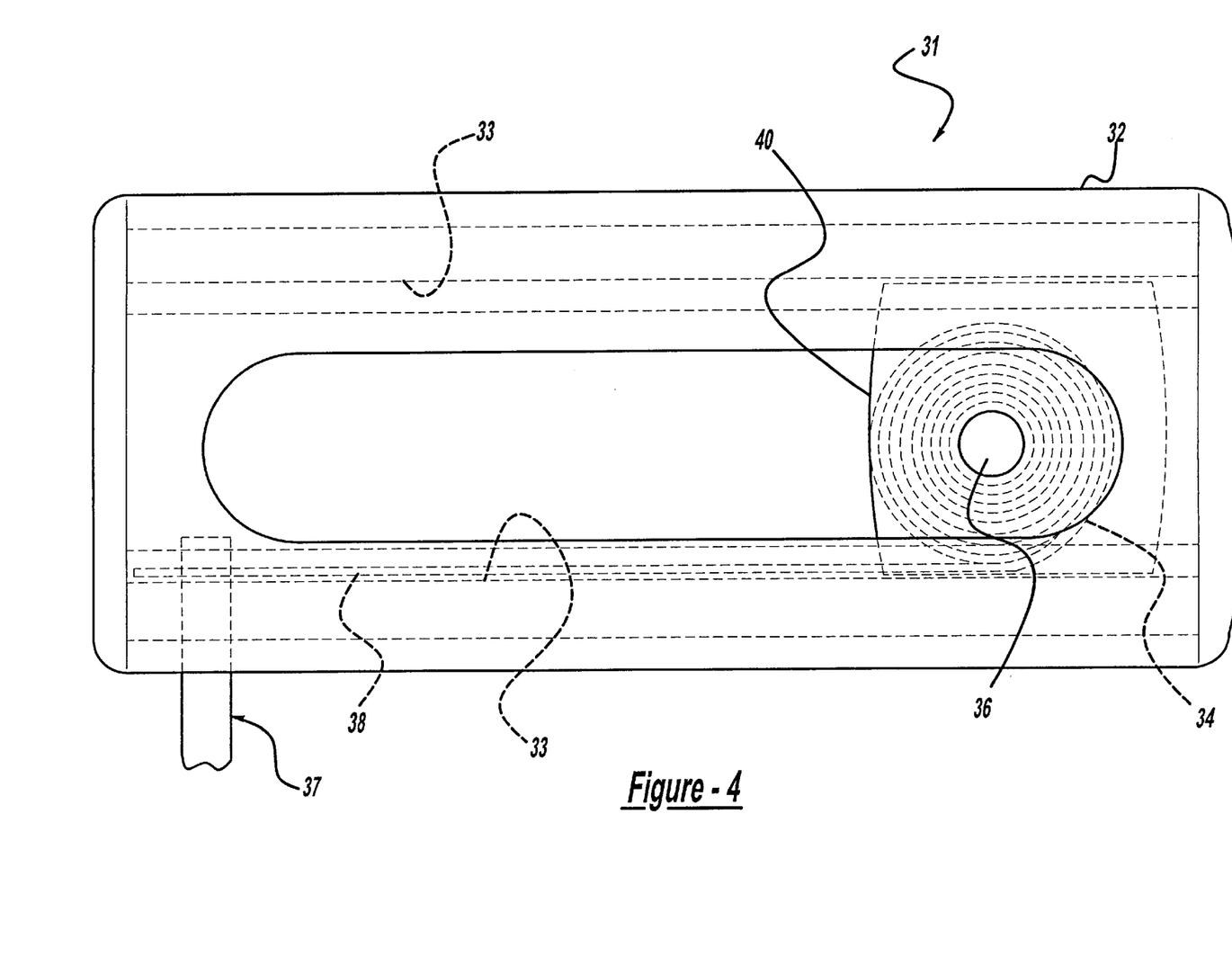
FIG. 4 is a plan view of the spring cassette according to the principles of the present invention.

FIG. 3 is a perspective detail view of the rearward bracket member 18 with a cut-away to fully show the spring cassette 31. The rearward bracket member 18 includes a pair of channels 24 on opposite sides of the main body 20 (only one is shown for explanation). Spring cassette housing 31 is disposed within channel 24. With reference to FIGS. 3 and 4, the spring cassette housing 31 includes a major cassette 32 which houses the minor cassette 40 in an internal track. The minor cassette 40 includes a tension spring 34 wound around a center cylinder 36 with a leading end 38 of the tension spring 34 affixed to a holding pin 37. FIGS. 3 and 4 show the minor cassette 40 in its extended position with the rearward bracket member 18 in the retracted position. When released from external forces the tension spring 34 would draw the minor cassette 40 towards the holding pin 37 where the end of the leading edge 38 of the spring 34 is affixed. This motion would move the rearward bracket member 18 to an extended position relative to the forward bracket member 11, in addition the steering wheel, which is attached to the rearward bracket member 18, would also move. The tension spring 34 works to counteract the forces that hinder movement of the steering wheel by the user. The tension spring 34 can be designed to meet any force requirements.

Figure 5:
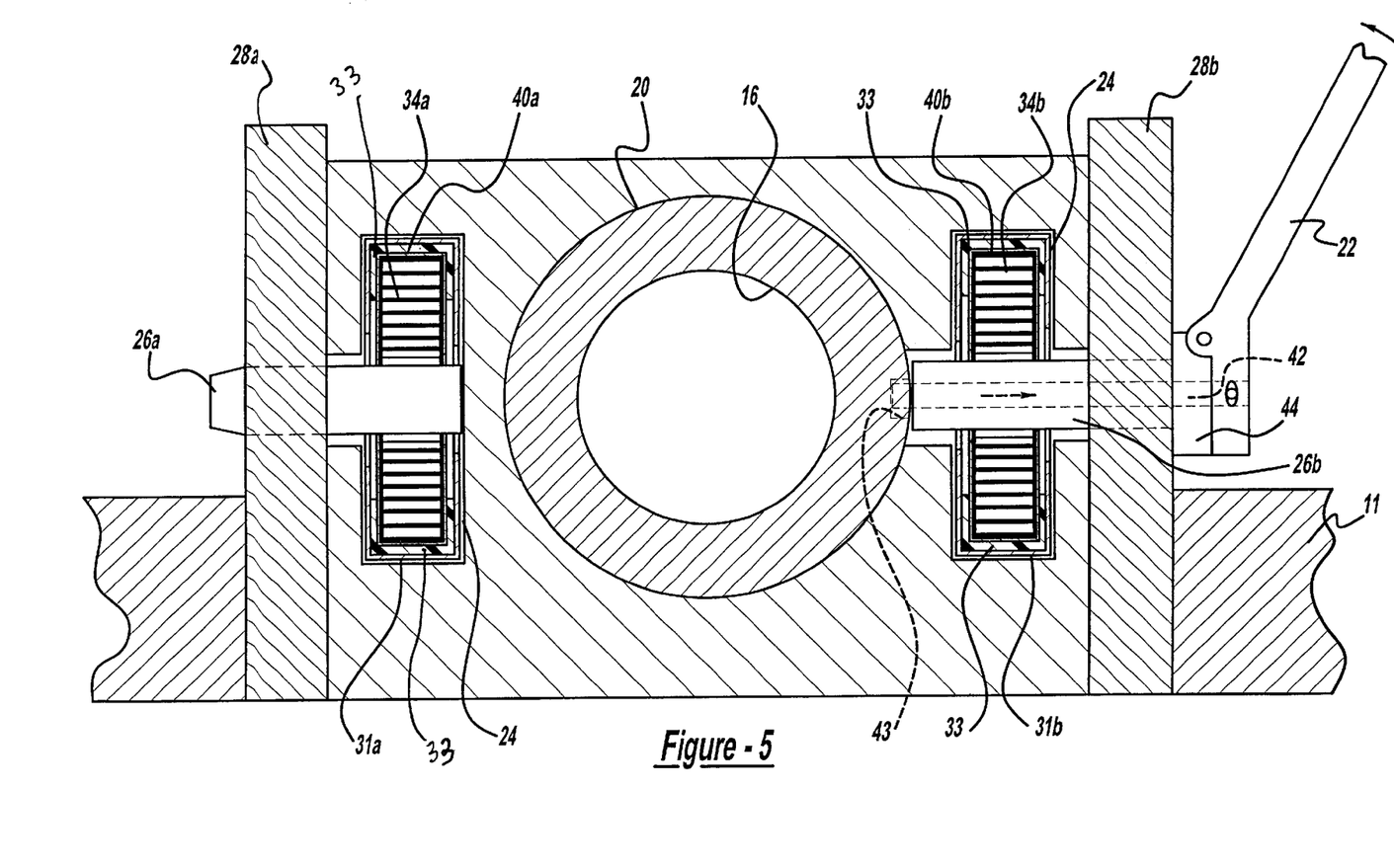
FIG. 5 is a cross-sectional view of the upper mounting bracket taken along the line 5—5 of FIG. 1.

FIG. 5 is a cross-sectional view taken along line 5—5 from FIG. 1. The engagement between the main body 20 of the forward bracket member 11 and rearward bracket member 18 is shown in cross-section. Many of the components have equivalents on either side of the main body 20. The bore 16 through the main body 20 receives a steering shaft 53 (shown in FIG. 6). The channels 24 are formed into both sides of the rearward bracket member 18. The channels 24 contain the spring cassettes 31a and 31b. The spring cassettes 31a and 31b further include the minor cassettes 40a and 40b which house the tension springs 34a and 34b. Spring cassettes 31a and 31b include plastic internal guide tracks 33 which slidably support minor cassette 40a, 40b within the major cassette housings 32. The tension springs 34a and 34b are wound springs wound around a central cylinder 36 through which the mounting pins 26a and 26b are slidably received. The mounting pins 26a, 26b are not fixedly attached to the main body 20 of the rearward bracket member 18, however they are fixedly attached to the mounting pillars 28a and 28b which are a part of the forward bracket member 11.

The rearward bracket member 18 is allowed to move axially relative to the forward member 11. The mounting pins 26a and 26b support the minor cassette 40a, 40b while the tension springs 34a and 34b translate a force to the rearward bracket member 18 thus assisting movement of the rearward bracket member 18. The lever 22 allows the user to selectively engage and disengage locking pin 42 from a plurality of positioning slots 43 spaced axially along main body 20. Lever 22 is pivotally or otherwise connected to the mounting pillar 28 to allow activation of said lever in a pre-selected direction to cause pin 42 to disengage from slot 43. While the positioning pin 42 is disengaged the rearward bracket member 18 may be repositioned relative to the forward bracket member 11. Once a comfortable position is selected by the user the positioning pin 42 is re-engaged in a new positioning slot 43. A plurality of positioning slots 43 may be created in the main body 20 of the forward bracket member 11 to allow for a plurality of selectable positions.

Figure 6:
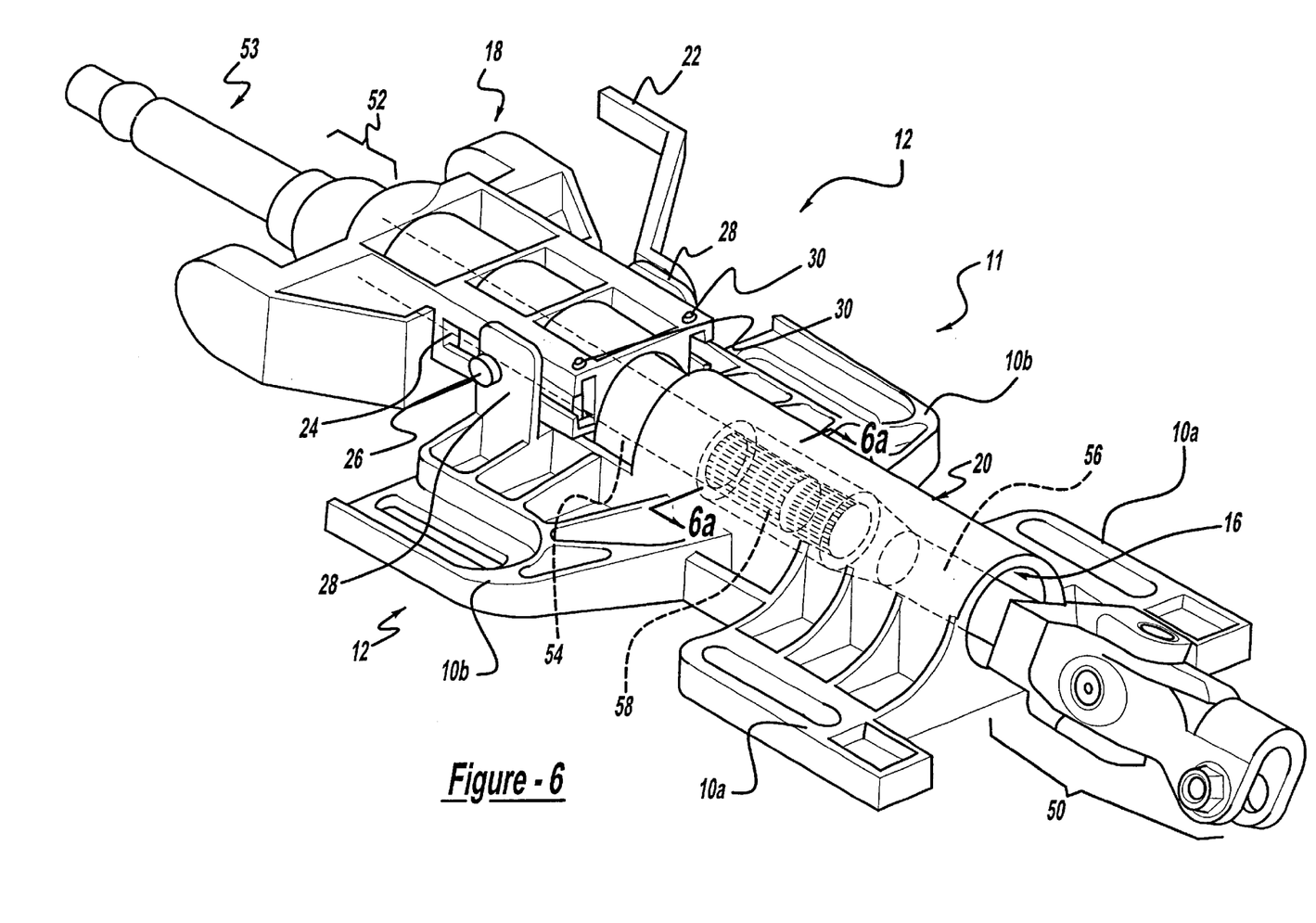
FIG. 6 is a perspective view of the upper mounting bracket further illustrating the placement of several sections of the steering shaft and their interactions.

FIG. 6 shows a perspective view of the mounting bracket 12 including a main body 20 with a steering shaft 53, partially shown in phantom, extending through the bore 16. Steering shaft 53 is supported for rotation relative to mounting bracket 12 by appropriate bearings such as 52. The steering shaft 53 includes at least two main sections the rearward shaft section 54 and the forward shaft section 56.

Figure 6A:
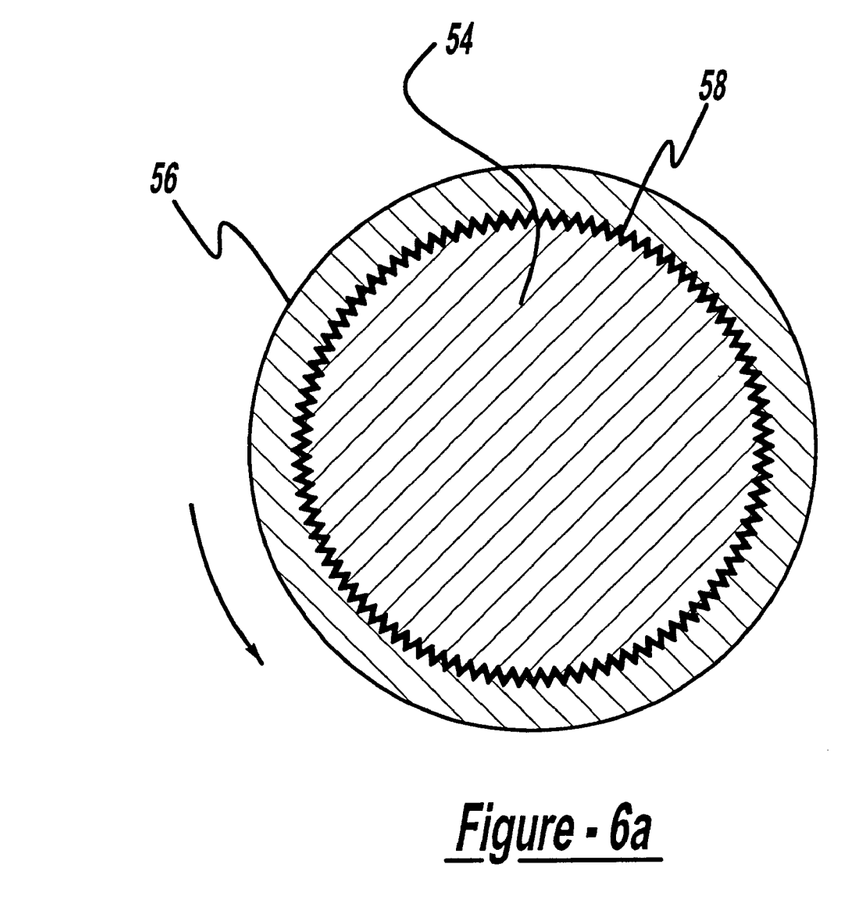
FIG. 6a is a cross-sectional view of the steering shaft indicating the interlocking of the spline on a section of the steering shaft.

A steering wheel (not shown) is mounted on a first terminal end of the rearward shaft section 54. The second terminal end of rearward shaft section 54 inserts into a first terminal end of the forward shaft 56. The second terminal end of the forward shaft section 56 connects to a steering linkage through connections not relevant to this invention. The rearward shaft section 54 and the forward shaft section 56 are not fixedly attached to one another, rather they slidably interconnect through splines 58. In this way as the rearward shaft section 54 is able to move axially relative to the forward shaft section 56, yet still allow for a continuous rotational connection therebetween. Turning briefly to FIG. 6a a cross-section along line 6a—6a indicates a detail of the spline connection 58. The rearward shaft section 54 being the inner core and the forward shaft section 56 being the outer portion.

Returning specifically to FIG. 6 the workings of the telescoping mechanism, can now be seen. The spline connection 58 of the steering shaft 53 allows for axial displacement of the rearward shaft section 54 without disengaging the steering shaft 53 from the steering wheel. Furthermore, the rearward bracket member 18 is interconnected with the forward bracket member 11 through the telescoping mechanism including the spring cassette 31 (shown in FIG. 4.), mounting pin 26 and mounting pillars 28. The mounting pins 26 are affixed to the mounting pillars 28 thereby creating a stable platform to hold the rearward bracket member 18. The mounting pins 26 then interconnect with the spring cassette 31, thus allowing for a transference of the force create by the spring to the rearward bracket member 18 allowing for ease of movement of the rearward bracket member 18.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automobile comprising:
    a steering column;
    a mounting bracket for the steering column, the mounting bracket for affixing to a support stricture of the automobile, said mounting bracket being movable axially so as to allow selectable increase and decrease of axial length, wherein said mounting bracket comprises:
        a main body affixed to said support structure; and
        a minor body connected to said main body in such a manner so as to allow displaceable movement relative to said main body; and
        a biasing component to bias said axial movement, wherein said biasing component includes a tape spring contained in a cassette affixed externally to the steering column, wherein said cassette comprises:
            an upper member and a lower member which oppose one another and form a track affixed to the mounting bracket;
            a housing which is slidably engaged with said track;
            the tape spring wound around a central opening and enclosed in said housing; and
            said tape spring including a leading edge fixedly mounted to a first end of said track.

2. The automobile of claim 1 wherein said biasing component further comprises a locking pin for temporarily fixing said minor body at a selectable axial length.

3. The automobile of claim 2 wherein said locking pin is actuated through a mechanical lever by a user.

4. The automobile of claim 3 wherein said biasing component may formed so as to allow for a plurality of biasing forces.

5. The automobile of claim 4 wherein said main body includes mounting pins which intersect said central opening of said tape spring wherein said biasing force of said biasing spring may be translated to said main body.

6. A telescoping steering column mounting bracket assembly, comprising:

a forward body for supporting a forward portion of a telescoping steering column, the forward body for fixedly attaching to a support structure;

a rearward body for supporting a rearward portion of a telescoping steering column, the rearward body capable of axial movement relative to the forward body so as to allow selectable increase and decrease of axial length; and a biasing component to bias said axial movement, wherein said biasing component includes a tape spring slidably engaged with a track in said rearward body and exerting a force between the forward body and rearward body;

wherein said biasing component comprises:
an upper member and a lower member which oppose one another and form the track in the rearward body;
a housing which is slidably engaged with said track;
the tape spring wound around a central opening and enclosed in said housing;
said tape spring including a leading edge fixedly mounted to a first end of said track wherein said biasing force of said biasing spring may be translated to said rearward body.

7. The apparatus of claim 6 wherein said biasing component further comprises a locking pin for temporarily fixing said rearward body at a selectable axial length.

8. The apparatus of claim 7 wherein said locking pin is actuated through a mechanical lever by a user.

9. The apparatus of claim 8 wherein said biasing component may be formed so as to allow for a plurality of biasing forces.

10. The apparatus of claim 9 wherein said forward body includes fixedly attached mounting pins which intersect said central opening of said tape spring wherein said biasing force of said biasing spring may be translated to said forward body.

11. An apparatus adapted to bias a telescoping steering column of an automobile comprising:

an upper member and a lower member which oppose one another and form a track;

a housing which is slidably enclosed within said track;

a tape spring wound around a central opening and enclosed in said housing;

said tape spring including a leading edge fixedly mounted to a first end of said track.

\* \* \* \* \*